United States Patent [19]
Tsujiuchi et al.

[11] Patent Number: 4,962,540
[45] Date of Patent: Oct. 9, 1990

[54] METHOD AND APPARATUS FOR DETECTING CORRESPONDING REGIONS BETWEEN PICTURE IMAGES

[75] Inventors: Junpei Tsujiuchi, Kawasake; Shigeto Ikeda, Tokyo; Toshio Honda, Yokohama; Nagaaki Ohyama, Kawasaki; Eric Badique, Tokyo; Susumu Kikuchi, Hachioji, all of Japan

[73] Assignee: Olympus Optical Co., Ltd., Tokyo, Japan

[21] Appl. No.: 453,382

[22] Filed: Nov. 27, 1989

Related U.S. Application Data

[63] Continuation of Ser. No. 101,328, Sep. 25, 1987, abandoned.

[30] Foreign Application Priority Data

Sep. 26, 1986 [JP] Japan .................................. 61-227452
Jun. 11, 1987 [JP] Japan .................................. 62-145530

[51] Int. Cl.$^5$ .............................................. G06K 9/46
[52] U.S. Cl. .......................................... 382/17; 382/1; 358/28; 358/80
[58] Field of Search ...................... 364/526; 382/1, 17, 382/18; 358/27, 28, 29, 29 C, 31, 80

[56] References Cited

U.S. PATENT DOCUMENTS

| | | | |
|---|---|---|---|
| 4,314,274 | 2/1982 | Atoji et al. | 358/80 |
| 4,621,284 | 11/1986 | Nishioka et al. | 358/107 |
| 4,675,704 | 6/1987 | Yamamoto | 358/282 |
| 4,677,465 | 6/1987 | Ackofer | 358/75 |
| 4,683,490 | 8/1987 | Strolle et al. | 358/31 |
| 4,721,951 | 1/1988 | Holler | 358/80 |
| 4,763,186 | 8/1988 | Belhares-Sarabia et al. | 358/80 |

FOREIGN PATENT DOCUMENTS 0004885 6/1982 European Pat. Off. .
61-71791 4/1986 Japan .

OTHER PUBLICATIONS

"Erkennungssysteme mit quadratischen Klassifikatoren und optimierter Merkmalsextraktion: Konzeption, Eigenschaften, Erkennungsleistung", Rainer Ott, Wiss. Ber. AEG– TELEFUNKEN 54, Mar. 1981, pp. 115-128, (English Translation).
English Translation of the Ranier OTT Publication, "Recognition Systems with Quadratic Classifiers and Optimized Characteristic Extraction: Conception, Features and Recognition Performance".
Proceeding ICASSP '86, vol. 3, pp. 1785-1788, (1986).

*Primary Examiner*—Leo H. Boudreau
*Assistant Examiner*—Jose L. Couso
*Attorney, Agent, or Firm*—Armstrong, Nikaido, Marmelstein, Kubovcik & Murray

[57] ABSTRACT

The method of detecting corresponding regions between primary color picture images comprises respective steps of converting three primary color signals of color picture images to at least two signals based on these three primary color signals, calculating the variance of the mutual concentration distribution in the operation object regions of the three primary color picture images from these converted signals and detecting the set of regions in which the calculated variance value is minimum. The apparatus for realizing the above mentioned method comprises a converting device for converting three primary color picture signals of color picture images to at least two signals based on these three primary color signals, a variance calculating device for calculating the variance of the mutual concentration distribution in the operation object regions of the three primary color picture images from the signals converted by this converting device and a corresponding region detecting device for detecting the set of regions in which the variance value calculated by this variance calculating device is minimum.

35 Claims, 13 Drawing Sheets

METHOD AND APPARATUS FOR DETECTING CORRESPONDING REGIONS BETWEEN PICTURE IMAGES

This application is a continuation of application Ser. No. 101,328 filed Sept. 25, 1987 now abandoned.

FIELD OF THE INVENTION

This invention relates to a method and apparatus for detecting corresponding regions between primary color picture images whereby corresponding regions can be more simply and precisely detected between respective primary color picture images.

RELATED ART STATEMENT

The picture image information which can bear various and many informations has recently come to be elevated in the utility in a wide range of fields.

Now, in a color picture image formed of three primary color picture images of red, green and blue (which shall be abbreviated respectively as R, G and B hereinafter), the case correlated with the form distribution in the actual field of the respective three primary color picture images shall be considered. In the case that regions corresponding to each other within three primary color picture images are to be detected between different primary color picture images, heretofore, for example, a correlating operation has been made to find out a region in which the value is maximum. A phase correlating method mentioned, for example, in the Proceeding ICASSP 86, Vol. 3, 1785-1788 (1986) can be enumerated as such method. In this phase correlating method, in respective primary color picture images, in case the positions of the corresponding picture elements are displaced, the corresponding region is detected to correct the displacement of the positions.

According to this phase correlating method, it is possible to detect the corresponding region certainly at a high precision. However, in this phase correlating method, the Fourier conversion and reverse Fourier conversion must be made for each of the object regions and the calculation amount is so large that, in order to reduce the processing time, a special large sole circuit is required. There is such practical problem.

Now, if the correlating operation is to be made in the actual field without making the Fourier conversion, such differences mostly in the brightness as the illumination fluctuation and shadow will have an influence and no favorable result will be obtained in some case.

OBJECTS AND SUMMARY OF THE INVENTION

An object of the present invention is to provide a method and apparatus for detecting corresponding regions between primary color picture images whereby corresponding regions can be more simply detected between respective primary color picture images.

Another object of the present invention is to provide a method and apparatus for detecting corresponding regions between respective primary color picture images whereby corresponding regions can be precisely detected by reducing the influence on the brightness between respective primary color picture images.

In the present invention, three primary color signals of color picture images are converted to at least two signals based on these three primary color signals, the variance of the mutual concentration or density distributions in the operation object regions of the three primary color images is calculated from these converted signals and the corresponding regions are detected by detecting the set of regions in which this calculated variance value is minimum.

In case the respective regions in the respective primary color picture images are regions corresponding to each other, the variance of the mutual concentration or density distribution will be minimum. Therefore, the corresponding region is detected by detecting the set of regions in which the variance of the mutual concentration or density distribution is minimum. Also, when the three primary color signals of the color picture images are converted to at least two signals based on these three primary color signals, the mutual concentration or density distribution will be able to be calculated by converting the signals to be of values hard to be influenced by the brightness or extracting the values hard to be influenced by the brightness from the converted signals.

The other features and advantages of the present invention will become apparent enough with the following explanation.

BRIEF DESCRIPTION OF THE DRAWINGS

FIG. 1 is a formation diagram of a circuit realizing this embodiment.

FIG. 2 is a flow chart showing the process of this embodiment.

FIG. 3 is an explanatory diagram showing the of three primary colors.

FIG. 4 is an explanatory diagram showing a mutual concentration distribution.

FIG. 5 is a functional block diagram showing the formation of a controller.

FIG. 6 is a formation diagram of a circuit realizing this embodiment.

FIG. 7 is an explanatory diagram showing a mutual concentration distribution.

FIG. 8 is a formation diagram of a circuit realizing this embodiment.

FIG. 9 is an explanatory diagram showing the coordinate axes of three converted signals in a color space.

FIG. 10 is an explanatory diagram showing the distribution of three converted signals.

FIG. 11 is a formation diagram of a circuit realizing this embodiment.

FIG. 12 is an explanatory view showing the coordinate axes of three converted signals in a color space.

FIGS. 14 to 16 relate to the fifth embodiment of the present invention.

FIG. 14 is a block diagram of an endoscope apparatus realizing this embodiment.

FIG. 15 is an elevation of a rotary filter.

DETAILED DESCRIPTION OF THE PREFERRED EMBODIMENTS

FIGS. 1 to 5 show the first embodiment of the present invention.

Figure 1:
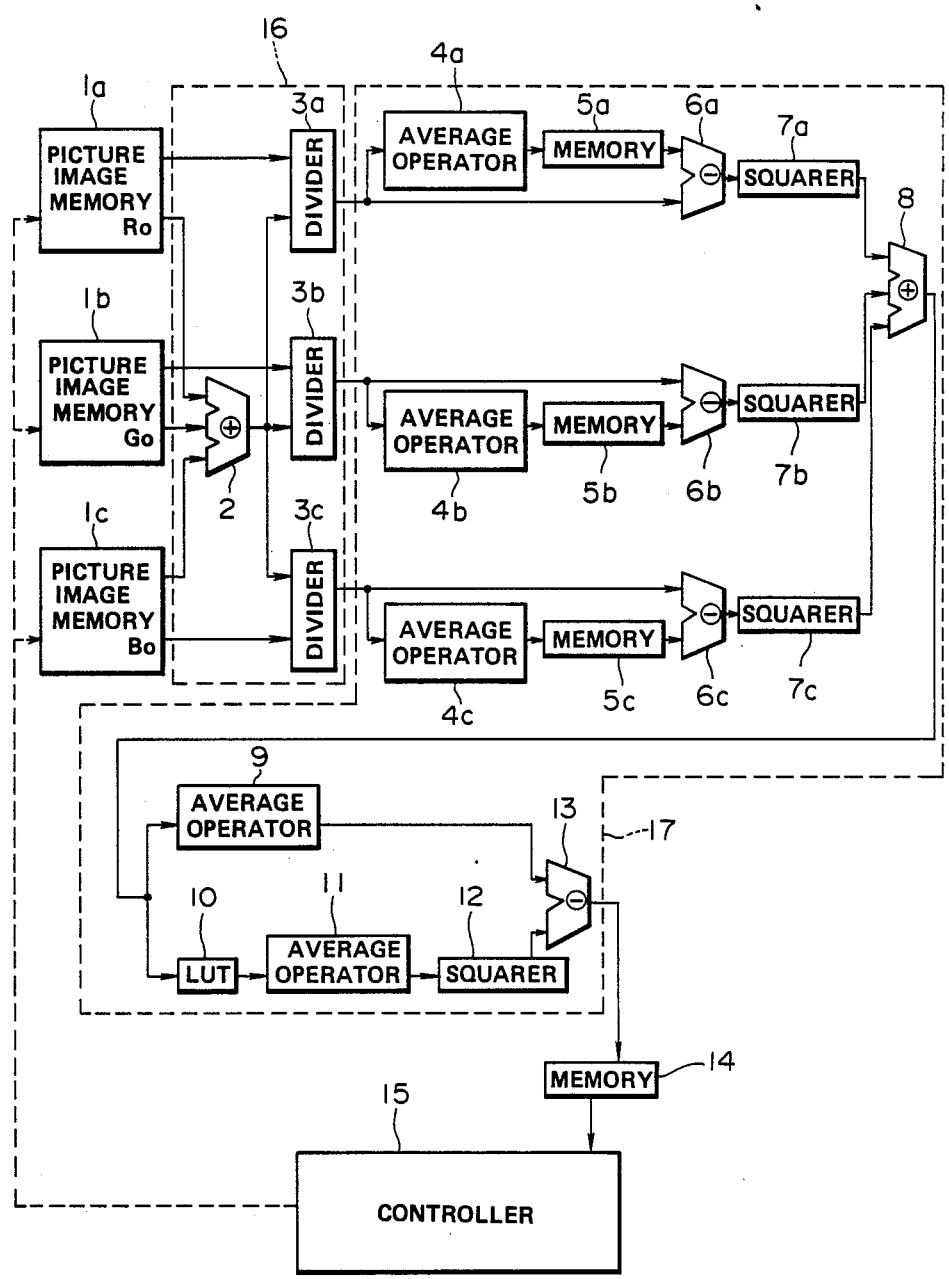
FIGS. 1 to 5 relate to the first embodiment of the present invention.

In FIG. 1, three primary color picture images $R_o$, $G_o$ and $B_o$ are stored respectively in picture image memories 1a, 1b and 1c. Operation object regions X, Y and Z are set by a controller 15 respectively within these three primary color picture images $R_o$, $G_o$ and $B_o$. The picture image signals R, G and B of the respective set regions X, Y and Z are delivered for the respective picture elements to an adder 2 whereby the sum $R+G+B$ of the picture image signals is calculated. The picture image signals R, G and B of the above mentioned set regions X, Y and Z are delivered respectively also to dividers 3a, 3b and 3c and are divided by the sum $R+G+B$ of the above mentioned picture image signals respectively by these dividers 3a, 3b and 3c.

Thus, in this embodiment, a converting means 16 is formed of the above mentioned adder 2 and dividers 3a, 3b and 3c. The picture image signals R, G and B respectively of the above mentioned set regions X, Y and Z are converted by this converting means 16 respectively to signals $R'=R/(R+G+B)$, $G'=G/(R+G+B)$ and $B'=B/(R+G+B)$ having had the influence of the brightness corrected.

The outputs R', G' and B' respectively from the above mentioned dividers 3a, 3b and 3c are delivered respectively to average operators 4a, 4b and 4c and the averages $<R'>$, $<G'>$ and $<B'>$ respectively of the converted signals R', G' and B' are calculated on all the picture elements within the above mentioned set regions X, Y and Z respectively by these average opertors 4a, 4b and 4c. These averages $<R'>$, $<G'>$ and $<B'>$ are stored respectively in memories 5a, 5b and 5c.

From the outputs R', G' and B' respectively from the above mentioned dividers 3a, 3b and 3c are subtracted respectively $<R'>$, $<G'>$ and $<B'>$ stored respectively in the above mentioned memories 5a, 5b and 5c respectively by the subtracters 6a, 6b and 6c. The operation results $R'-<R'>$, $G'-<G'>$ and $B'-<B'>$ are squared respectively by squarers 7a, 7b and 7c formed of multipliers or look-up table memories. The outputs from the above mentioned squarers 7a, 7b and 7c are added by an adder 8 to obtain $d^2=(R'-<R'>)^2+(G'-<G'>)^2+(B'-<B'>)^2$.

The output $d^2$ from the above mentioned adder 8 is operated by an average operator 9 to calculate an average $<d^2>$ on all the picture elements within the above mentioned set regions X, Y and Z. On the other hand, the output $d^2$ from the above mentioned adder 8 is input also into a look-up table memory 10 and a square root d of $d^2$ is obtained by this look-up table memory 10. The output d of this look-up table memory 10 is operated by an average operator 11 to calculate an average $<d>$ in the above mentioned set regions X, Y and Z and is further squared by a square 12.

The output $<d^2>$ of the above mentioned average operator 9 and the output $<d>^2$ of the above mentioned squarer 12 are subtracted from each other by a subtracter 13 and the operation result is stored in a memory 14.

In this embodiment, a variance calculating means 17 is formed of the average operators 4a, 4b and 4c to subtracter 13. If the operation result obtained from the above mentioned subtracter 13 is represented by V, this V will be represented by $$V=<d^2>-<d>^2$$

which represents a variance of the operation result d until the above mentioned adder 8.

This variance V is compared in the size with the variance V of a different set of the set regions X, Y and Z respectively of the above mentioned three primary color picture images $R_o$, $G_o$ and $B_o$ by a controller 15. The set of the regions X, Y and Z in which the above mentioned variance V is minimum is detected as a corresponding region.

Figure 5:
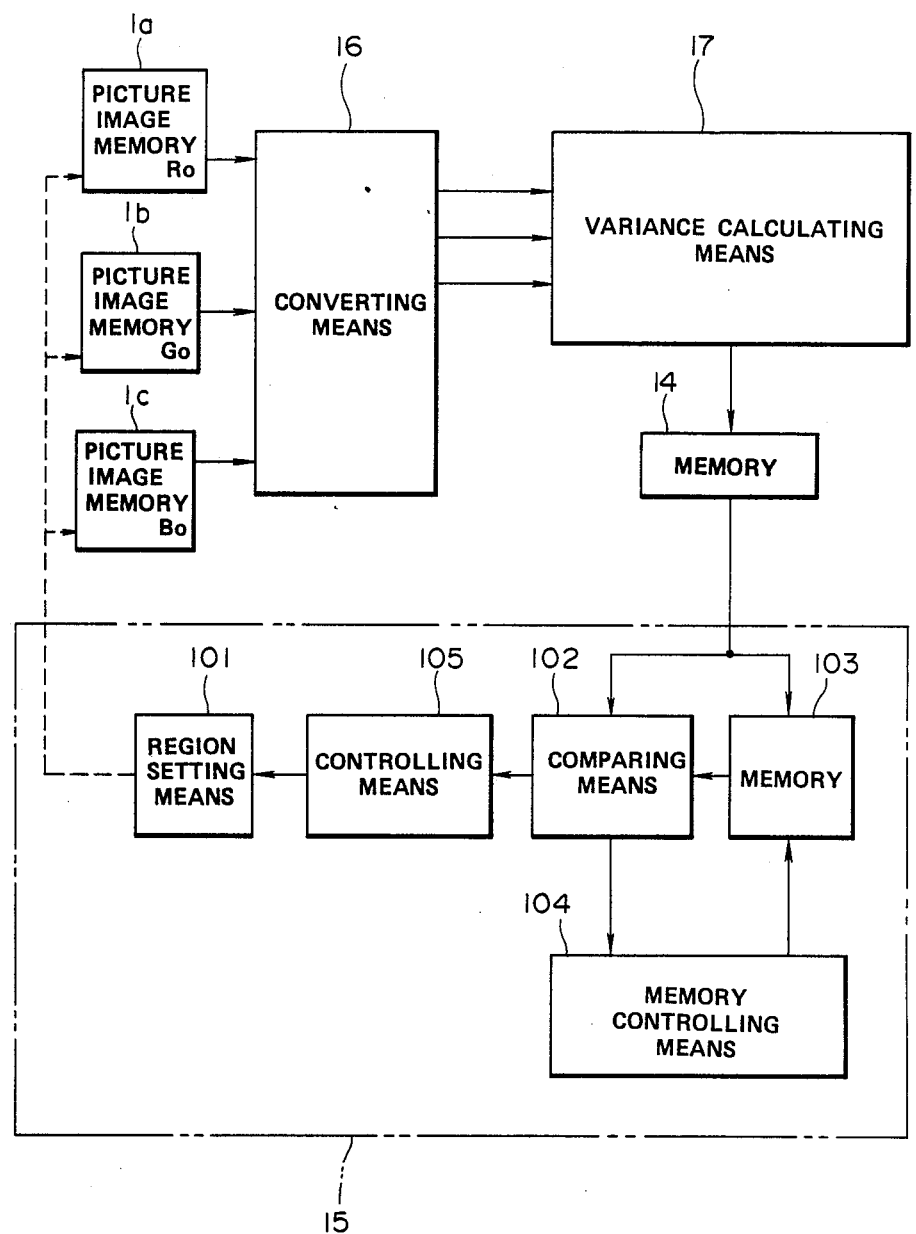

The above mentioned controller 15 is formed as shown, for example, in FIG. 5.

That is to say, the above mentioned controller 15 comprises a region setting means 101 for setting the operation object regions X and Y for the picture image memories 1a and 1b, a comparing means 102 for comparing the variance value V calculated by the variance calculating means 17 with a reference value $V_{min}$, a memory 103 capable of memorizing the above mentioned reference value $V_{min}$ and the address, for example, of the operation object region Y, a memory controlling means 104 for inputting the output of the above mentioned comparing means 102 and controlling the above mentioned memory 103 to memorize the above mentioned variance value V as a new reference value $V_{min}$ only in case the above mentioned variance value V is smaller than the above mentioned reference value $V_{min}$ and the address of the operation object region Y then as a new address $Y_{min}$ and a controlling means 105 for comparing the above mentioned variance value V with the reference value $V_{min}$ by the above mentioned comparing means 102 to obtain the variance value V in a different combination of the operation object regions X and Y and then controlling the above mentioned region setting means 101 to change one Y of the above mentioned operation object regions X and Y.

Figure 4:
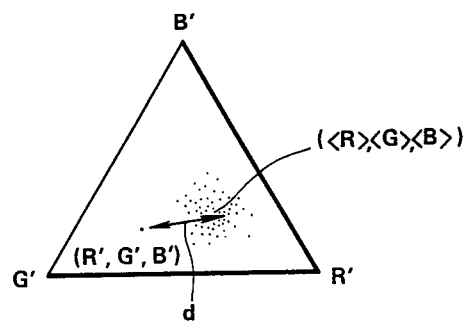

The process of this embodiment shall be explained in the following with reference to FIGS. 2 and 4.

Figure 2:
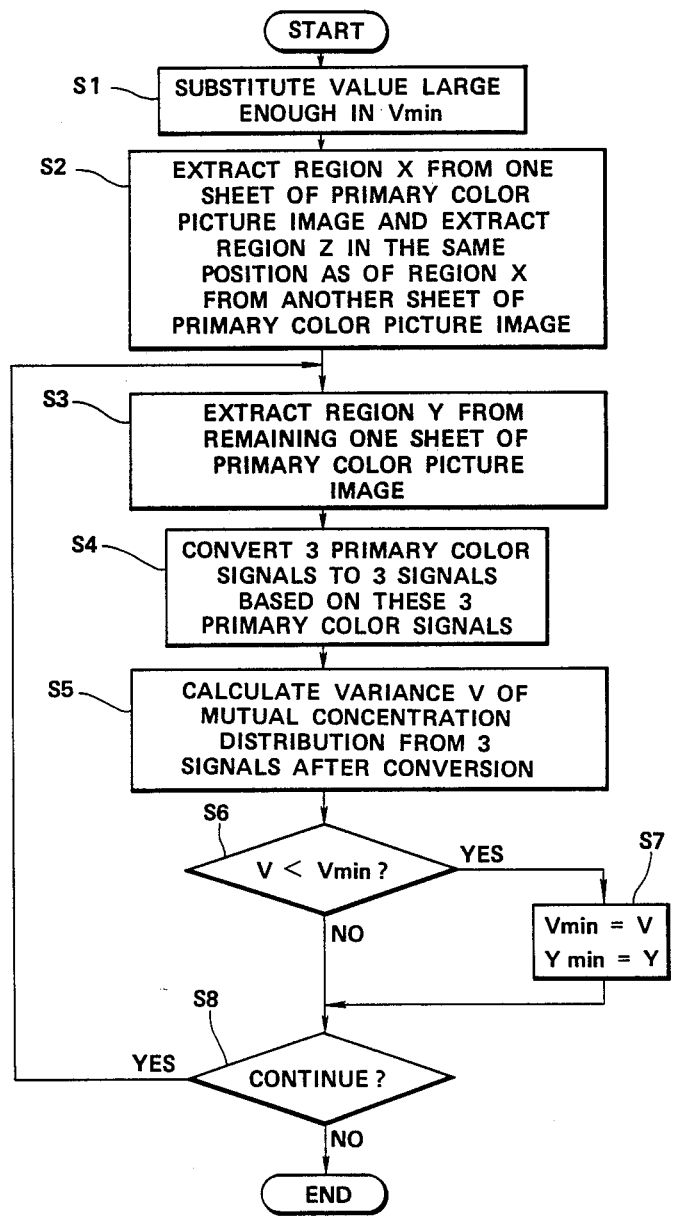

First of all, in the step S1 in FIG. 2, a value large enough as the reference value $V_{min}$ is substituted in the memory 103 of the controller 15.

Then in the step S2, the specific set region X is extracted from one sheet, for example, $R_o$ of the three primary color picture images $R_o$, $G_o$ and $B_o$ stored respectively in the picture image memories 1a, 1b and 1c and the region Z is set in the same position as of the above mentioned region X from the other one sheet, for example, $B_o$. In the step S3, from the remaining one sheet, for example, $G_o$, the set region Y is extracted to detect the region corresponding to the above mentioned region X. It is thought that as if the three primary color picture images were formed of the above mentioned regions X, Y and Z.

Then, in the step S4, by the converting means 16 comprising the adder 2 and dividers 3a, 3b and 3c, the picture image signals R, G and B respectively of the above mentioned set regions X, Y and Z are divided by the sum $R+G+B$ of these picture signals to be converted respectively to $R'=R/(R+G+B)$, $G'=G/(R+G+B)$ and $B'=B/(R+G+B)$.

Figure 3:
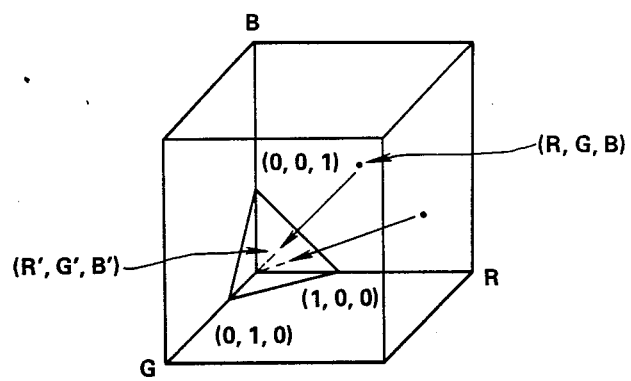

The significance of dividing the above mentioned picture image signals R, G and B by the sum R+G+B of these picture image signals shall be explained with reference to FIG. 3. In FIG. 3, the concentration values of the respective picture image signals R, G and B in the three regions of the picture elements located in the same positions respectively in the regions X, Y and Z set respectively within the three primary color picture images $R_o$, $G_o$ and $B_o$ are plotted as points respectively of coordinates (R, G and B) in a space (temporarily called a color space) in which the concentration values of the picture image signals R, G and B are taken on three axes intersecting at right angles with one another. By dividing the point (R,G,B,) in the above mentioned color space by the sum R+G+G of the picture image signals, the distribution of the point (R,G,B) within the above mentioned color space can be converted to the distribution of a point (R', G', B') projected toward the origin (0,0,0) onto a plane (temporarily called a color degree plane) passing through the three points of (1,0,0), (0,1,0) and (0,0,1). It is known that, in the color picture images, R+G+B represents the brightness. It can be considered that the values R', G' and B' projected onto the above mentioned color degree plane have no information of the brightness and represent hues and colored degrees.

Then, in the step S5, the variance V of the mutual concentration distributions of the regions X, Y and Z is calculated by the variance calculating means 17. That is to say, first of all, by the operating process by the average operators 4a, 4b and 4c to the adder 8, $d^2 = (R' - <R'>)^2 + (G' - <G'>)^2 + (B' - <B'>)^2$ is calculated from the respective three converted signals R', G' and B' of the above mentioned set regions X, Y and Z.

The significance of the above mentioned operation result $d^2$ shall be explained with reference to FIG. 4 which shows the distribution of the mutual concentration values (R', G' and B') as converted on the above mentioned color degree plane. In this diagram, the distance between the coordinate (R', G', B') of each mutual concentration value as converted and the coordinate (<R'>, <G'>, <B'>) of the average of the concentration values as converted is represented by $d = \{(R' - <R'>)^2 + (G' - <G'>)^2 + (B' - <B'>)^2\}^{\frac{1}{2}}$. Therefore, the operation by the above mentioned average operators 4a, 4b and 4c to the adder 8 is to determine the square $d^2$ of the distance d between the coordinate (R', G', B') of each mutual concentration value and the coordinate (<R'>, <G'>, <B'>) of the average of the concentration values.

Then, from the output $d^2$ of the above mentioned adder 8, by the operating process by the average operator 9 to subtracter 13, $V = <d^2> - <d>^2$ is calculated and is stored in the memory 14.

Then, in the step S6, by the comparing means 102, the above mentioned variance value V is compared in the size with a reference value $V_{min}$ memorized in the memory 103. Only in case the variance value V is smaller than the reference value $V_{min}$, in the step S7, by the memory controlling means 104, the above mentioned variance value as a new reference value $V_{min}$ and the address Y of the operation object region then as a new address $Y_{min}$ are memorized in the memory 103.

Then, in the step S8, whether the process is to be continued or not is judged. In case it is to be continued, in the step S3, by the controlling means 105, the regions X and Z of the picture images $R_o$ and $B_o$ are made invariable and the region Y of the picture image $G_o$ is changed. Then, the process in and after the step S8 is made.

When the process in and after the step S8 is repeated while making the regions X and Z of the picture images $R_o$ and $B_o$ invariable and varying the region Y of the picture image $G_o$, finally, the minimum value of the variance value V as a reference value $V_{min}$ and the address of the region Y in which the variance value V is minimum will be memorized in the above mentioned memory 103.

Thus, by the controller 15, in the case that the regions X and Z of the picture images $R_o$ and $B_o$ are made invariable and the picture image $G_o$ is varied, the variances V of the respective sets of the regions X, Y and Z are compared in the size and the region Y in which the variance V is minimum is detected.

In case the regions X and Y set within the two picture images $R_o$ and $G_o$ are regions corresponding to each other, the expanse of the points (R', G' and B') of the respective mutual concentration values in the above mentioned color degree plane will be smallest. Therefore, the corresponding region can be detected by detecting the set of the regions in which the above mentioned variance V is minimum.

Also, the corresponding set of the regions X, Y and Z can be detected by detecting the region Z corresponding to the region X of the picture image $R_o$ from the picture image $B_o$ by the same process as in the above.

Thus, in this embodiment, the picture image signals R, G and B of the respective picture elements of the set regions X, Y and Z of the three primary color picture images $R_o$, $G_o$ and $B_o$ are divided by the sum R+G+B of these picture image signals to be converted to R', G' and B' and then the variance of the mutual concentration distribution is calculated. Therefore, such influence of the brightness as of the illumination and shadow can be excluded and corresponding regions can be precisely detected by such simple means as the calculation of the variance.

Figure 6:
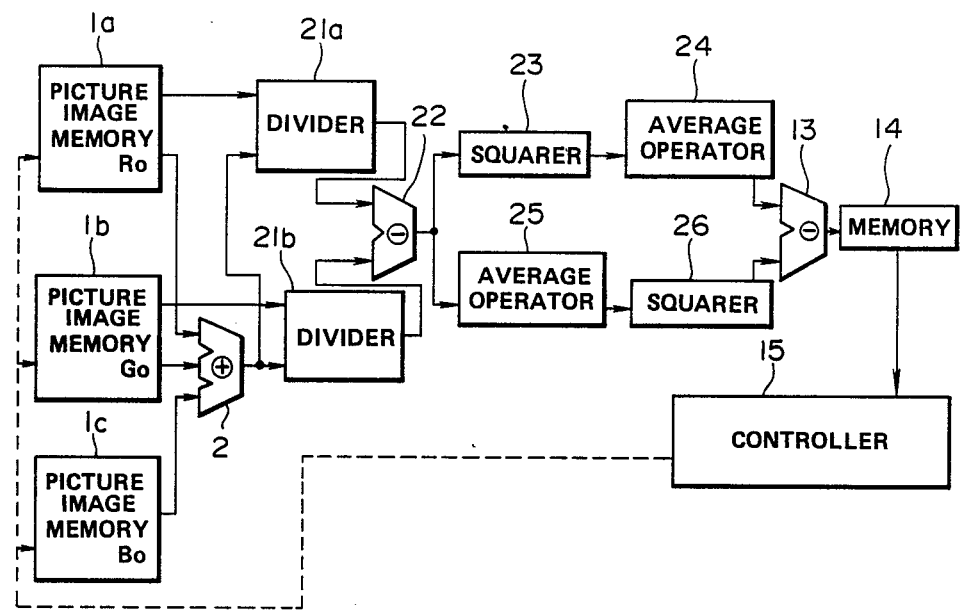
FIGS. 6 and 7 relate to the second embodiment of the present invention.
Figure 7:
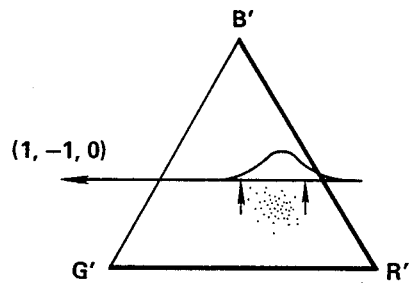

FIGS. 6 and 7 show the second embodiment of the present invention.

As shown in FIG. 6, in this embodiment, the picture image signals R, G and B of the respective set regions X, Y and Z of the three primary color picture images $R_o$, $G_o$ and $B_o$ stored respectively in the picture image memories 1a, 1b and 1c are delivered for the respective picture elements to the adder 2 and the sum R+G+B of the picture image signals is calculated by this adder.

The picture image signals R and G of the above mentioned set regions X and Y are delivered respectively also to dividers 21a and 21b and are divided by the sum R+G+B of the above mentioned picture image signals by these dividers 21a and 21b to be converted respectively to R'=R/(R+G+B) and G'=G/(R+G+B).

The outputs R' and G' respectively from the above mentioned dividers 21a and 21b are subtracted by a subtracter 22 to obtain R'−G'.

The outpur R'−G' from the above mentioned subtracter 22 is delivered to a squarer 23 and is squared by this squarer 23 and an average $<(R'-G')^2>$ on all the picture elements within the above mentioned set regions X, Y and Z is calculated by an average operator 24. On the other hand, the output R'−G' from the above mentioned subtracter 22 is delivered also to an average operator 25 and an average $<R'-G'>$ on all the picture elements within the above mentioned set regions X, Y and Z is calculated by this average operator 25 and is further squared by a squarer 26 to obtain $R'-G'$.

The output $R'-G'^2$ of the above mentioned squarer 26 is subtracted from the output $<(R'-G')^2>$ of the above mentioned average operator 24 by the subtracter 13. The operation result is stored in the memory 14.

If the operation result obtained from the above mentioned subtracter 13 is represented by V, this V will be represented by $$V = <(R'-G')^2> - <R'-G'>^2$$

which represents the variance of the operation result $R'-G'$ until the above mentioned subtracter 22.

The above process is repeated the same as in the above mentioned first embodiment while making the region X of the picture image $R_o$ invariable and varying the region Y of the picture image $G_o$, the variances V of the respective sets of the regions X and Y are compared in the size and the region Y in which the variance V is minimum is detected.

In this embodiment, by calculating $R'-G'$, as shown in FIG. 7, the distribution of the mutual concentration values ($R'$, $G'$ and $B'$) as converted in the color degree plane is projected onto a straight line in the $(1, -1, 0)$ direction and the variance of the distribution is calculated. As described above, in case the above mentioned set regions X and Y are regions corresponding to each other, the variance of the distribution of the mutual concentration values ($R'$, $G'$ and $B'$) in the above mentioned color degree plane will be smallest. Particularly, in case the regions X and Y of the primary color picture images $R_o$ and $G_o$ are made objects, the size of the above mentioned variance will appear conspicuously in the $(1, -1, 0)$ direction. The corresponding regions on the primary color picture images of $R_o$ and $G_o$ can be detected by calculating the variance of $R'-G'$ and detecting the minimum value. In the same manner, in the case of detecting the corresponding region between the primary color picture images of $G_o$ and $B_o$, the variance of $G'-B'$ may be calculated and, in the case of detecting the corresponding region between the primary color picture images of $B_o$ and $G_o$, the variance of $B'-R'$ may be calculated.

According to this embodiment, the same as in the first embodiment, the influence of the brightness can be excluded and the corresponding region can be detected by a simpler calculation and a circuit formation realizing it.

Figure 8:
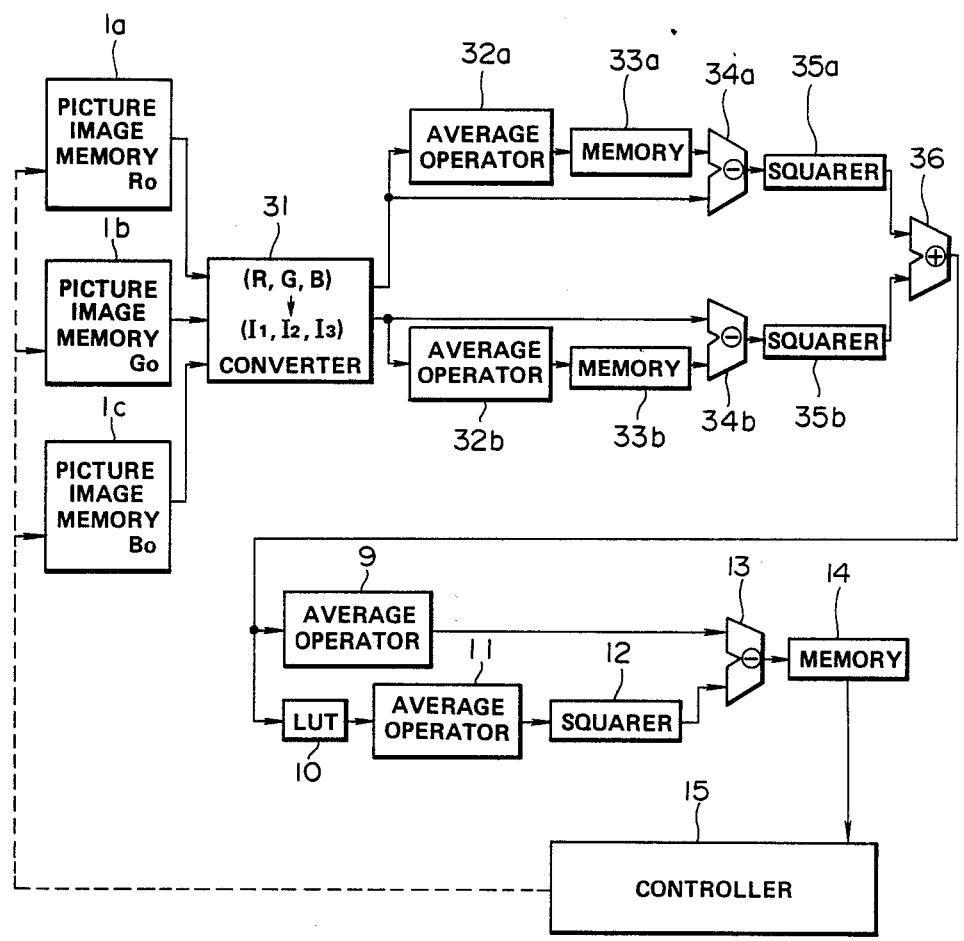
FIGS. 8 to 10 relate to the third embodiment of the present invention.
Figure 9:
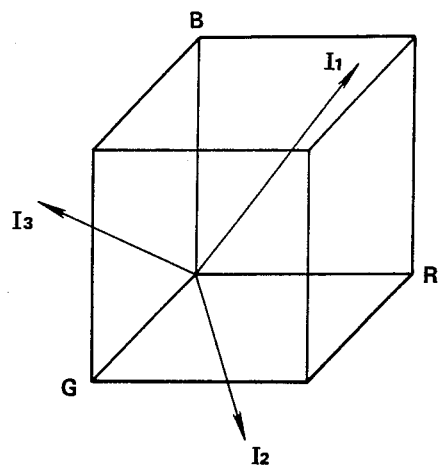
Figure 10:
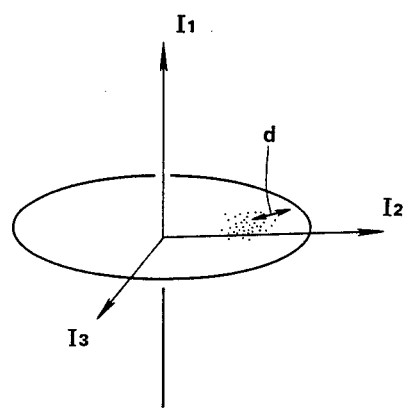

FIGS. 8 to 10 show the third embodiment of the present invention.

As shown in FIG. 8, in this embodiment, the picture image signals R, G and B of the respective set regions X, Y and Z of three primary color picture images $R_o$, $G_o$ and $B_o$ stored respectively in the picture image memories 1a, 1b and 1c are delivered to a converter 31 of $(R,G,B,) \rightarrow (I_1, I_2, I_3)$ for the respective picture elements and, by this converter 31, the three primary color signals of R, G and B are converted to three other sinals $I_1$, $I_2$ and $I_3$ based on these three primary color signals. For these three signals ($I_1$, $I_2$ and $I_3$) are used such (Y, I and Q) signals used to transmit television signals as are formed of a quantity (Y) representing the brightness and values (I and Q) on two axes in a plane representing the hue and colored degree and intersecting at right angles with Y.

From the above mentioned converter 31, only two signals ($I_2$ and $I_3$) having had the quantity (temporarily made $I_1$) representing the brightness removed are taken out and, by respective average operators 32a and 32b, averages $I_2$ and $I_3$ are calculated on the above mentioned set regions X, Y and Z and are stored respectively in memories 33a and 33b.

Then, by subtracters 34a and 34b, subtraction is made between the signals ($I_2$ and $I_3$) from the above mentioned converter 31 and the above mentioned average values $<I_2>$ and $<I_3>$ stored in the above mentioned memories 33a and 33b and the subtraction results are squared by squarers 35a and 35b. The outputs from the above mentioned squarers 35a and 35b are added by an adder 36 to obtain $$d^2 = (I_2 - <I_2>)^2 + (I_3 - <I_3>)^2.$$

Then, from the output $d^2$ of the above mentioned adder 36, in the same manner as in the first embodiment, by the operating process by the average operator 9 to subtracter 13, $V = <d^2> - <d>^2$ is calculated and is stored in a memory 14.

In the same manner as in the above mentioned first embodiment, the above process is repeated while making the region X of the picture image $R_o$ invariable and varying the region Y of the picture image $G_o$ and, by a controller 15, the variances of the sets of the regions X and Y are compared in the size and the region Y in which the variance V is minimum is detected.

FIG. 9 shows coordinate axes of three signals $I_1$, $I_2$ and $I_3$ as converted set in a color space. The $I_1$ axis among these three axes represents the brightness and is defined in the direction close to the (1,1,1) direction.

FIG. 10 shows the mutual distribution of the three signals as converted in the ($I_1$, $I_2$, $I_3$) space as projected onto the ($I_2$,$I_3$) plane. In case the above mentioned set regions X and Y are regions corresponding to each other, the expanse of the distribution in the above mentioned ($I_2$,$I_3$) plane will be smallest.

In this embodiment, the variance $V = <d^2> - <d>^2$ of the distance d from the average values ($<I_2>$, $<I_3>$) of the respective points ($I_2$,$I_3$) in the above mentioned ($I_2$,$I_3$) plane is calculated and the corresponding region is detected by detecting the set of the regions X and Y in which this variance V is minimum.

Thus, according to this embodiment, the influence of the brightness can be excluded by projecting the three primary color signals R, G and B of the color picture images onto the plane ($I_2$,$I_3$) intersecting at right angles with the axis ($I_1$) representing the brightness. Also, by calculating the variance of the distance d from the average values ($<I_2>$, $<I_3>$) of the respective points ($I_2$,$I_3$) on the ($I_2$,$I_3$) plane, in whatever form the manner of the distribution may be, the corresponding region can be detected.

Figure 11:
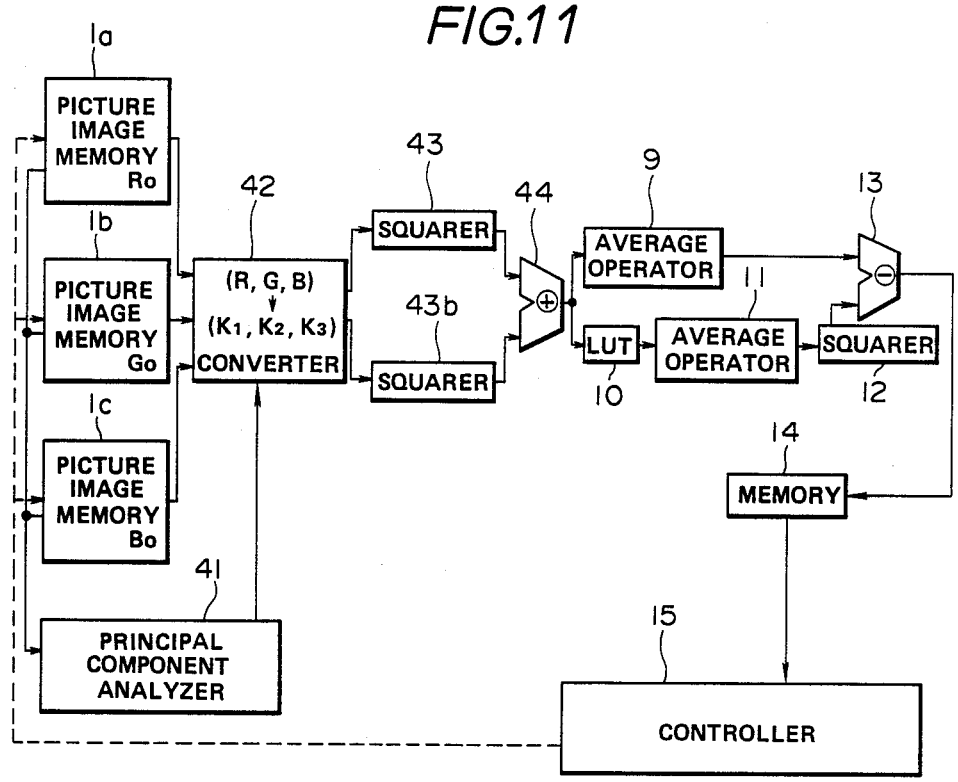
FIGS. 11 and 12 relate to the fourth embodiment of the present invention.
Figure 12:
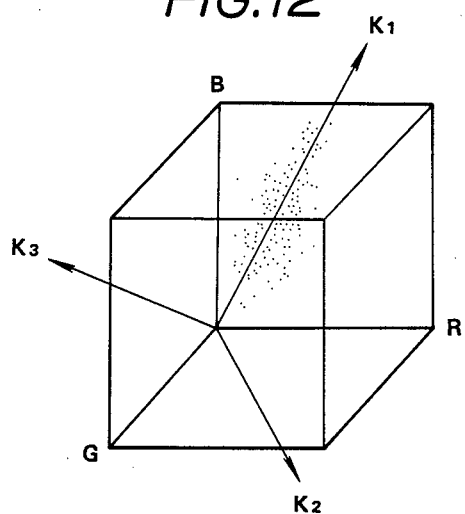

FIGS. 11 and 12 show the fourth embodiment of the present invention.

As shown in FIG. 11, in this embodiment, first of all, by a principal component analyzer 41, the principal component directions of the concentration distributions of the color picture images stored in advance in the picture image memories 1a, 1b and 1c, that is, the direction in which the variance is largest and two directions intersecting at right angles with it are detected. The conversion coefficient in the three principal component directions obtained by this principal component analyzer 41 is delivered to an $(R, G, B) \rightarrow (K_1, K_2, K_3)$ converter 42.

The picture image signals R, G and B of the respective set regions X, Y and Z of the three primary color picture images $R_o$, $G_o$ and $B_o$ stored respectively in the above mentioned picture image memories 1a, 1b and 1c are delivered for the respective picture elements to the above mentioned converter 42. By this converter 42, the three primary color signals R, G and B are converted to be of three principal component values $K_1$, $K_2$ and $K_3$. Two values ($K_2$ and $K_3$) except the first principal component value (temporarily called $K_1$) in which the variance is largest are output from this converter 42, are squared respectively by squarers 43a and 43b and are then added by an adder 44 to obtain $d^2 = K_2^2 + K_3^2$.

Then, $V = <d^2> - <d>^2$ is calculated from the output $d^2$ of the above mentioned adder 44 by the operating process by the average operator 9 to subtracter 13 the same as in the first embodiment and is stored in the memory 14.

The same as in the above mentioned first embodiment, the above process is repeated while making the region X of the picture image $R_o$ invariable and varying the region Y of the picture image $G_o$ and, by the controller 15, the variances V of the respective sets of the regions X and Y are compared in the size and the region Y in which this variance is minimum is detected.

Figure 13:
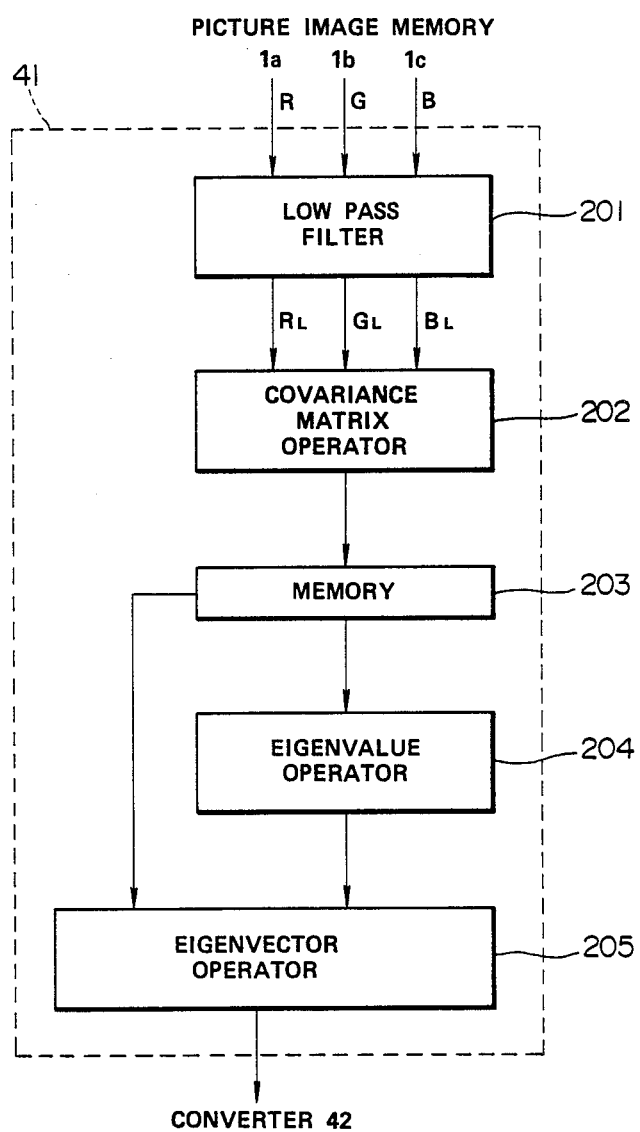
FIG. 13 is a block diagram showing the formation of a principal component analyzer.

Now, the above mentioned principal component analyzer 41 is formed as shown, for example, in FIG. 13.

That is to say, the picture image signals R( ), G( ) and B( ) of the respective set regions of the three primary color picture images $R_o$, $G_o$ and $B_o$ stored respectively in the above mentioned picture image memories 1a, 1b and 1c are input into a low-pass filter 201, have proper low spatial frequency regions extracted by this low-pass filter 201 and are then input into a covariance matrix operator 202. This covariance matrix operator 202 comprise a squarer, multiplier, adder and cummulative adder. Respective variance values $\alpha RR^2$, $\alpha GG^2$, $\alpha BB^2$, $\alpha RG^2$, $\alpha GB^2$ and $\alpha BR^2$ are calculated on the three component values RL( ), GL( ) and BL( ).

Here, the covariance matrix V is defined as follows:

$$= \begin{pmatrix} \alpha RR^2 & \alpha RG^2 & \alpha BR^2 \\ \alpha RG^2 & \alpha GG^2 & \alpha GB^2 \\ \alpha BR^2 & \alpha GB^2 & \alpha BB^2 \end{pmatrix}$$

$$= \begin{pmatrix} <RL^2> - <RL>^2 & <RLGL> - <RL><GL> & <BLRL> - <BL><RL> \\ <RLGL> - <RL><GL> & <GL^2> - <GL>^2 & <GLBL> - <GL><BL> \\ <BLRL> - <BL><RL> & <GLBL> - <GL><BL> & <BL^2> - <BL>^2 \end{pmatrix}$$

wherein $x = \frac{1}{N} \Sigma \, x( \, )$

N: Number of picture elements of the object picture image.

The element of the above mentioned covariance matrix is once recorded in a memory 203 and is then input first into an eigen value operator 204 to solve the eigen equation represented by the formula (2):

$$VA = \gamma A \quad (2)$$

wherein $A = (A1, A2, A3)^t$: Eigen vector : Eigen value.

The above mentioned eigen value operator 204 is a circuit for calculating only the maximum root of the equation (3) for determining the eigen value $\gamma$ and comprises a multiplier, divider, adder and table converting memory.

$$| \, - \gamma \, | = \begin{vmatrix} \alpha RR^2 - \gamma & \alpha RG^2 & \alpha BR^2 \\ \alpha RG^2 & \alpha GG^2 - \gamma & \alpha GB^2 \\ \alpha BR^2 & \alpha GB^2 & \alpha BB^2 - \gamma \end{vmatrix} \quad (3)$$

$$= (\alpha RR^2 - \gamma)(\alpha GG^2 - \gamma)(\alpha BB^2 - \gamma) -$$

$$(\alpha RR^2 - \gamma)\alpha GB^2 - (\alpha GG^2 - \gamma)\alpha BR^2 -$$

$$(\alpha BB^2 - \gamma)\alpha RG^2 = 0$$

Then, the above mentioned covariance matrix element recorded in the above mentioned memory 203 and the output $\gamma$ from the above mentioned eigen value operator 204 are input into an eigen vector operator 205. The respective component values (n1, n2 and n3) of the eigen vector n for the above mentioned eigen value represented by the formula (4) are calculated in this eigen vector operator 205. The first principal component is obtained as a compound variable having the element of the above mentioned eigen vector as a coefficient.

From $( \, - \, ) = 0$, $$n1 = \frac{1}{\sqrt{A_1^2 + A_2^2 + 1}} A_1 \quad (4)$$

$$n2 = \frac{1}{\sqrt{A_1^2 + A_2^2 + 1}} A_2$$

$$n3 = \frac{1}{\sqrt{A_1^2 + A_2^2 + 1}}$$

wherein $$A_1 = \frac{\alpha RG^2 \alpha GB - \alpha BR(\alpha GG - \gamma)}{(\alpha RR^2 - \gamma)(GG^2 - \gamma) - \alpha RG^2}$$

$$A_2 = \frac{-(RR^2 - \gamma) \cdot A_1 - \alpha BR^2}{RG^2}$$

(1)

As shown in FIG. 12, in the case of a general color picture image, the direction (first principal component direction) in which the variance is largest is mostly the direction close to the (1,1,1) direction representing the brightness. Therefore, the above mentioned first principal component direction shall be assumed to be the direction of the brightness. In the case of detecting the corresponding region between the primary color picture images by calculating the variance of the concentration distribution as in the system of the present invention, in order to improve the precision, in the color space, it is preferable to remove the direction in which the variance is inherently large from the object of the calculation. In the case of the above mentioned third embodiment, when the first principal component direction substantially coincides with the axis $I_1$ representing the brightness set in advance, the precision will be high but, in case the displacement between the first principal component direction and the above mentioned $I_1$ axis is large, the precision will be low. Therefore, in this embodiment, the axis (first principal component direction) of the brightness piculiar to the picture image to be an object is determined by the principal component analyzer 41, the concentration distribution is projected onto a plane intersecting at right angles with this axis and the variance is calculated.

According to this embodiment, in whatever direction the concentration may be largely distributed in the color space of the color picture image to be an object, the influence of the brightness can be excluded and the corresponding region can be precisely detected.

Figure 14:
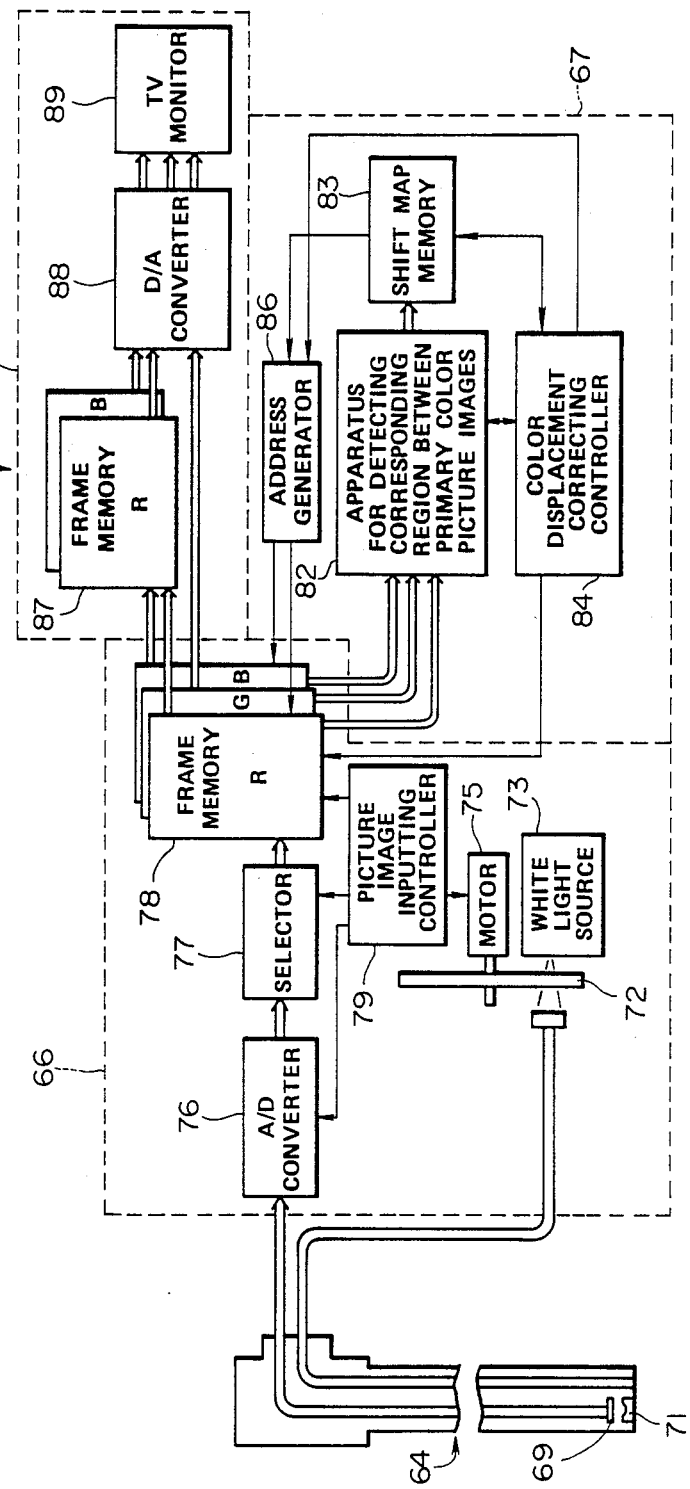
Figure 15:
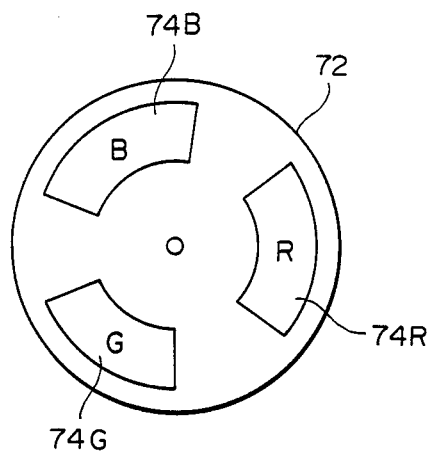

FIGS. 14 to 16 show the fifth embodiment of the present invention.

In the fifth embodiment of the present invention, the apparatus for detecting corresponding regions between picture images shown in the first to fourth embodiments is applied to an apparatus for correcting color displacements of electronic endoscope picture images by a field sequential system.

FIG. 14 shows the formation of this embodiment. An electronic endoscope apparatus 63 is formed as largely divided of an endoscope 64, color displacement correcting apparatus and picture image displaying apparatus 68.

Such monochromatic solid state imaging device 69 as a charge coupled device (CCD) is provided at the tip of the above mentioned endoscope 64 so that a picture image formed by an objective lens 71 may be formed on the imaging plane. An illuminating light is emitted from such white light source 73 as a xenon lamp within the above mentioned picture image input apparatus 66, passes through a rotary filter 72 and is then radiated from the tip of the insertable part through a light guide 74 formed of an optical fiber bundle and inserted through the above mentioned endoscope 64.

Here, as shown in FIG. 15, the above mentioned rotary filter 72 is disc-like and has color passing filters 74R, 74G and 74B made to respectively pass spectra of red(R), green(G) and blue(B) arranged in the peripheral direction. When the above mentioned rotary filter 72 is driven at a rate of one rotation per 1/30 second by a motor 75 within the above mentioned picture image input apparatus 66, the white light will be converted to the color lights of R, G and B in the time order and the above mentioned solid state imaging device 69 will be able to take a monochromatic picture image of an object eradiated with the respective color lights.

The picture image signal from the above mentioned solid state imaging device 69 is converted to a digital signal by an A/D converter 76 within the above mentioned picture image input apparatus 66 and is stored in a predetermined color region within a frame memory 78 by a selector 77.

A picture image input controller 79 provided within the above mentioned picture image input apparatus 66 is connected to the A/D converter 76, selector 77, frame memory 78 and motor 75 and controls the picture image signal of the object eradiated with the color lights of R, G and B so as to be able to stored in the respective frame memories 78.

The respective primary color picture images thus gradually accumulated in the above mentioned frame memories 78 are input into an apparatus 82 for detecting corresponding regions between primary color picture images formed of the apparatus for detecting corresponding regions between picture images mentioned in the first to fourth embodiments of the present invention within the above mentioned color displacement correcting apparatus 67, the displacement of the B picture image for the G and R picture images or of the R picture image for the G and B picture images is detected for the respective picture elements and the displacement is recorded as a shift amount 96 in a shift map memory 83.

The above mentioned color displacement detecting operation is controlled by a color displacement correcting controller 84 provided within the color displacement correcting apparatus 67.

Then, in an address generator 86, on the basis of the shift amount 96 recorded in the above mentioned shift map memory 83, a correcting address correcting the R and B picture images is generated and is sent to the above mentioned frame memory 78.

The above mentioned frame memory 78 is to output a picture image signal of R or B based on the above mentioned correcting address to the frame memory 87 within the above mentioned picture image displaying device 68 by the instruction of the color displacement correcting controller 84. The G signal in the above mentioned frame memory 78 and R and B signals in the above mentioned frame memory 87 are input into a D/A converter 88, are converted to analogue signals and are then displayed as color picture images by a TV monitor 89.

In this embodiment, the color displacement of the R picture image and color displacement of the B picture image are successively corrected by a set of color displacement correcting device 67. However, two sets of color displacement correcting devices for the R picture image and B picture image can be provided and connected in parallel to reduce the processing time.

Now, generally, in the field sequential system electronic endoscope, as described above, the illuminating light is changed to R, G and B color lights within 1/30 second, the thick and thin colors are successively input and the three primary color picture images are simultaneously output and displayed to thereby display the color picture images. However, in this system, in case the movement of the object or the endoscope itself is fast, the relative positions of the endoscope and object when the respective primary color picture images are imaged will be different, the reproduced picture image will be fogged or a colored edge will appeat and a so-called color displacement will occur.

In this embodiment, in order to correct such color displacement, the apparatus 82 for detecting corresponding regions between primary color images shown in the first to fourth embodiments is used to detect the corresponding region between the primary color picture images.

Figure 16A:
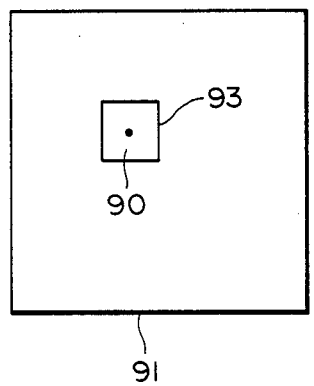
FIG. 16(a) is an explanatory diagram of a G picture image and B picture image.
Figure 16B:
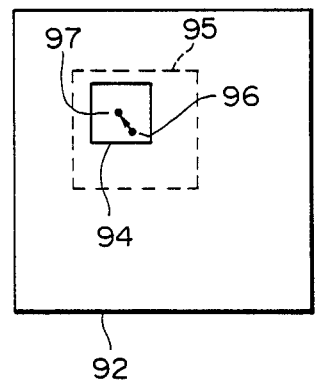
FIG. 16(b) is an explanatory diagram of an R picture image.

In FIGS. 16(a) and 16(b), the color displacement of the digital picture image stored in the above mentioned frame memory 78 is corrected by such input method as is described above.

In the above mentioned apparatus 82 for detecting corresponding regions between primary color images, in the case of determining the shift amount 96, for example, of the R picture image 92, a small region 94 of the same size is set within an R picture image 92 for a small region 93 set with each picture element within a G picture image and B picture image 91 as a center, the variance V of the mutual concentration distribution is calculated while moving the position of the small region 94 within a certain range 95, the set of the small region 93 of the G picture image and B picture image 91 and the small region 94 of the R picture image 92 in which the variance V is minimum is determined and the shift amount 96 then is output in the shift map memory 83.

The R picture image 92 is re-formed on the basis of the thus determined shift amount 96 in each picture element 97 of the R picture image 92 and the color picture image corrected in the color displacement is output and displayed.

By the way, the shift amount 96 in each picture element 97 is determined by such method as is described above on all the picture elements. However, the calculation amount may be reduced by a method wherein the shift amount is determined on the representative picture elements selected at fixed intervals and the shift amount is presumed by using a compensating method from those representative picture elements on the other picture elements.

According to this embodiment, a circuit of correcting the color displacement in the field sequential system electronic endoscope picture image within a short processing time can be realized by a comparatively simple circuit formation.

Figure 17:
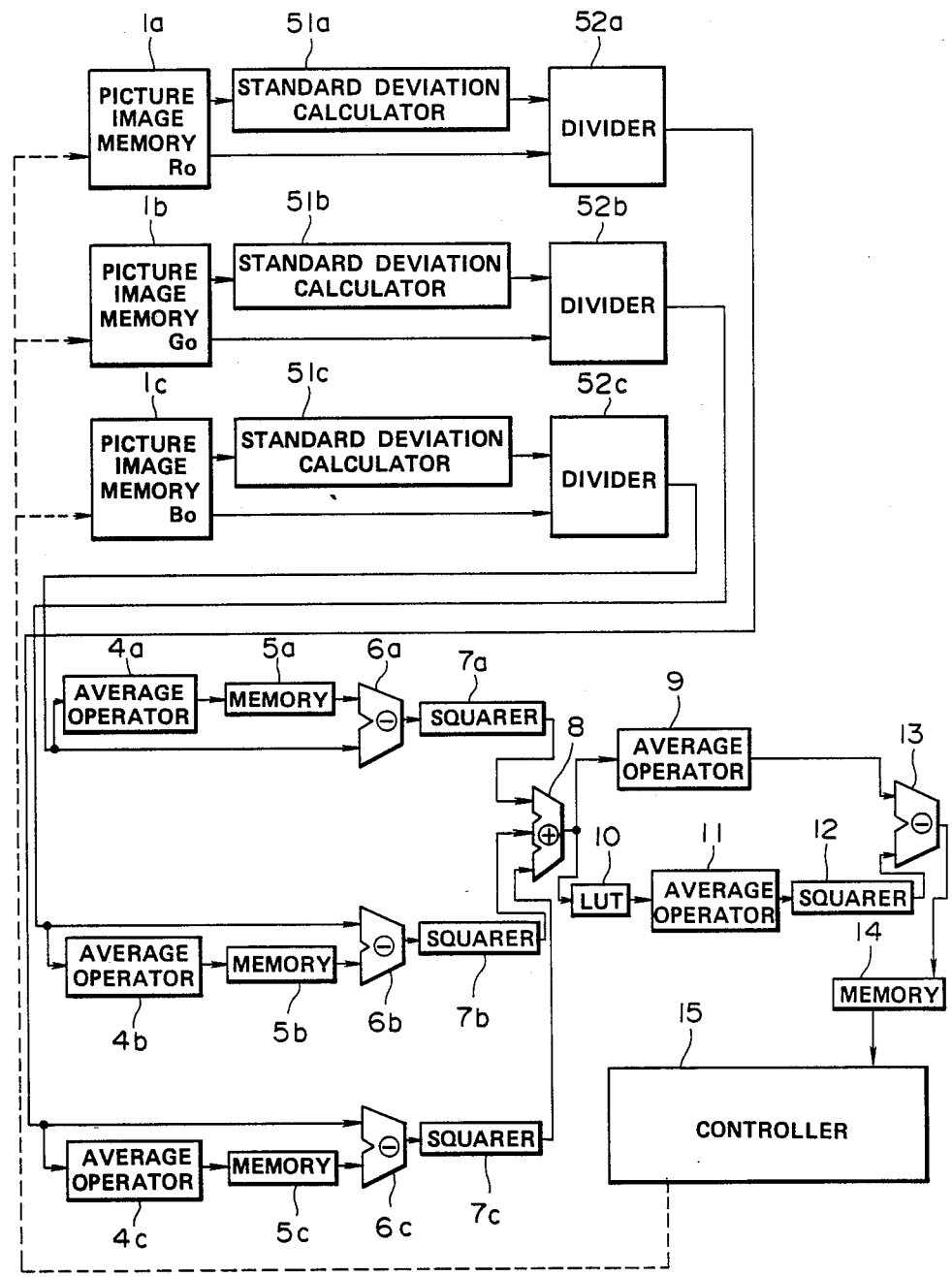
FIG. 17 is a formation diagram of a circuit realizing the sixth embodiment of the present invention.

FIG. 17 shows the sixth embodiment of the present invention.

In this embodiment, for the picture image signals R, G and B of the respective set regions X, Y and Z of the three primary color picture images $R_o$, $G_o$ and $B_o$ stored respectively in the picture image memories 1a, 1b and 1c, the standard deviations $\sigma R$, $\sigma G$ and $\sigma B$ of the concentration values are calculated by the standard deviation calculators 51a, 51b and 51c.

Also, the picture image signals R, G and B of the above mentioned set regions X, Y and Z are delivered for the respective picture elements to the respective dividers 52a, 52b and 52c and are divided respectively by the above mentioned standard deviations $\sigma R$, $\sigma G$ and $\sigma B$ to be converted to $R' = R/\sigma R$, $G' = G/\sigma G$ and $B' = B/\sigma B$.

$$d^2 = (R' - <R'>)^2 + (G' - <G'>)^2 + (B' - <B'>)^2$$

is calculated from the respective outputs R', G' and B' of the above mentioned dividers 52a, 52b and 52c by the operating process by the average operators 4a, 4b and 4c to the adder 8 the same as in the first embodiment.

Further, the variance $V = <d^2> - <d>^2$ of d is calculated from the output $d^2$ of the above mentioned adder 8 by the operating process by the average operator 9 to divider 13 and is stored in the memory 14.

The above process is repeated the same as in the above mentioned first embodiment while making the region X of the picture image $R_o$ invariable and varying the region Y of the picture image $G_o$, the variances V of the respective sets of the regions X and Y are compared in the size by the controller 15 and the region Y in which this variance V is minimum is detected.

Thus, in this embodiment, the picture image signals R, G and B of the set regions X, Y and Z of the three primary color picture images $R_o$, $G_o$ and $B_o$ are divided respectively by the standard deviations $\sigma R$, $\sigma G$ and $\sigma B$ of the concentration values, are converted to be respectively of the values R', G' and B' having had the differences of the dispersions of the concentration values among the respective primary color picture images $R_o$, $G_o$ and $B_o$ corrected and then the variance of the concentration distribution is calculated. Therefore, the differences of the dispersions of the concentration values among the respective primary color picture images $R_o$, $G_o$ and $B_o$ can be corrected and the corresponding regions can be precisely detected.

Figure 18:
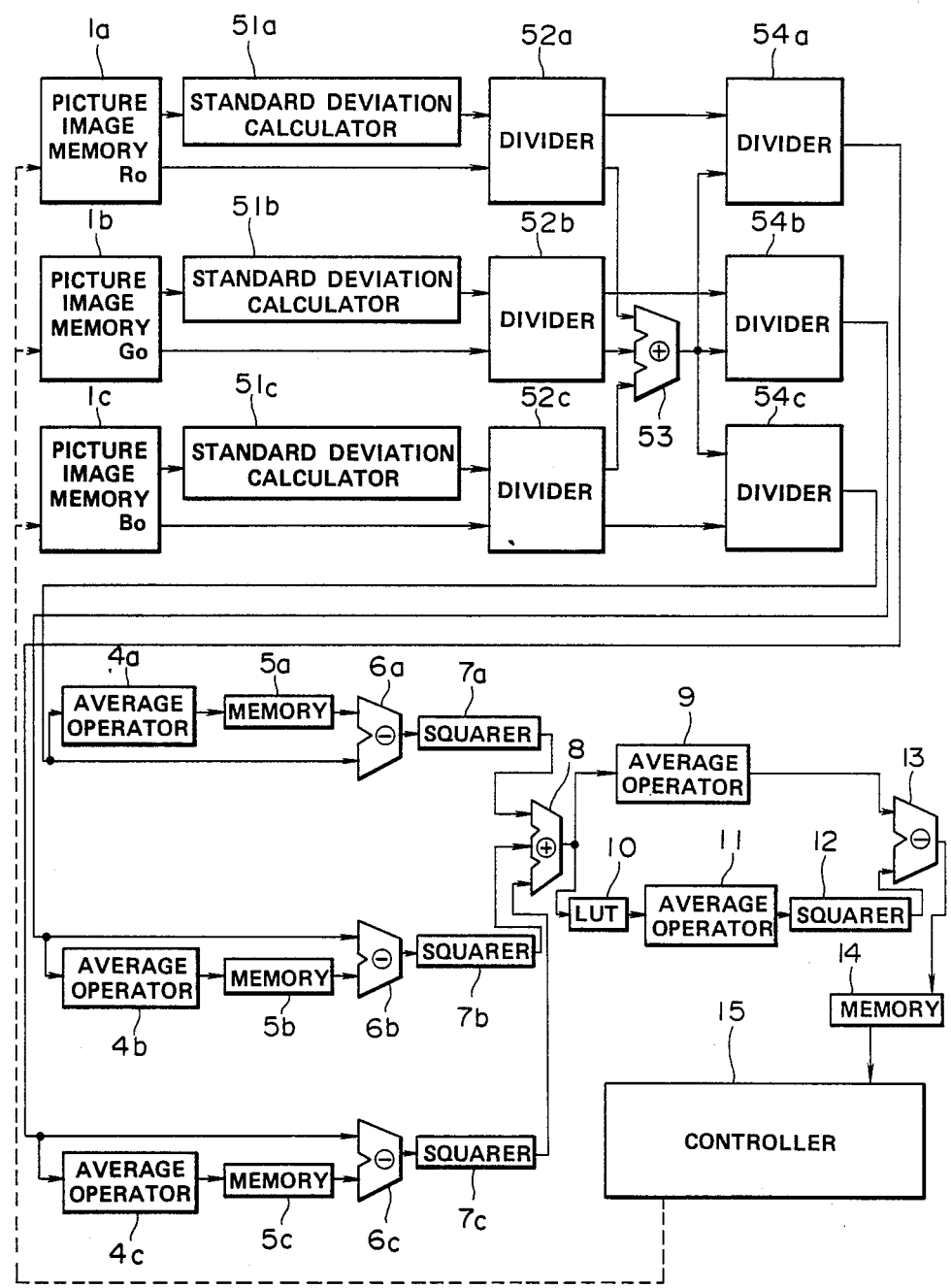
FIG. 18 is a formation diagram of a circuit realizing the seventh embodiment of the present invention.

FIG. 18 shows the seventh embodiment of the present invention.

In this embodiment, the same as in the above mentioned sixth embodiment, for the picture image signals R, G and B of the respective set regions X, Y and Z of the three primary color picture images $R_o$, $G_o$ and $B_o$ stored in the picture image memories 1a, 1b and 1c, the standard deviations $\sigma R$, $\sigma G$ and $\sigma B$ of concentration values are calculated by the standard deviation calculators 51a, 51b and 51c.

Also, the picture image signals R, G and B of the above mentioned set regions X, Y and Z are delivered for the respective picture elements to the dividers 52a, 52b and 52c, are divided respectively by the above mentioned standard deviations $\sigma R$, $\sigma G$ and $\sigma B$ by the dividers 52a, 52b and 52c and are converted to be of values $R' = R/\sigma R$, $G' = G/\sigma G$ and $B' = B/\sigma B$ having had the dispersions of the concentration values corrected.

The outputs R', G' and B' respectively from the above mentioned dividers 52a, 52b and 52c are delivered for the respective picture elements to the adder 53 and the sum $R' + G' + B'$ of the signals as converted is calculated by this adder 53. Also, the outputs R', G' and B' of the above mentioned dividers 52a, 52b and 52c are delivered respectively to the dividers 54a, 54b and 54c, are divided by the sum $R' + G' + B'$ of the concentration values of the signals as converted and are converted to be of the values $R'' = R'/(R' + G' + B')$, $G'' = G'/(R' + G' + B')$ and $B'' = B'/(R' + G' + B')$.

From these signals R", G" and B" as converted, $d^2 = (R'' - <R''>)^2 + (G'' - <G''>)^2 + (B'' - <R''>)^2$ is calculated by the operating process by the average operators 4a, 4b and 4c to the adder 8 the same as in the first embodiment.

Further, from the output $d^2$ of the above mentioned adder 8, the variance $V = <d^2> - <d>^2$ of d is calculated by the operating process by the average operator 9 to subtracter 13 and is stored in the memory 14.

The above process is repeated the same as in the above mentioned first embodiment while making the region X of the picture image $R_o$ invariable and varying the region Y of the picture image $G_o$, the variances V of the respective sets of the regions X and Y are compared in the size by the controller 15 and the region Y in which this variance V is minimum is detected.

Thus, in this embodiment, the picture image signals R, G and B of the set regions X, Y and Z of the three primary color picture images $R_o$, $G_o$ and $B_o$ are converted to be of values R", G" and B" in which both of the difference of the dispersion of the concentration values and the influence of the brightness are corrected and then the variance of the concentration distribution is calculated. Therefore, the influences of the difference of the dispersion of the concentration values and the difference of the brightness among the respective primary color picture images $R_o$, $G_o$ and $B_o$ can be excluded and the corresponding regions can be precisely detected.

As explained above, according to the present invention, the three primary color signals of color picture images are converted to three signals based on these three primary color signals and then the corresponding regions are detected by calculating the variance of the mutual concentration distribution. Therefore, there is an effect that the corresponding regions can be detected simply by a calculation simpler than in the conventional system and a circuit formation realizing it and precisely by reducing the influence of the brightness.

In this invention, it is apparent that working modes different in a wide range can be formed on the basis of this invention without departing from the spirit and scope of the invention. This invention shall not be restricted by its specific working mode except being limited by the appended claims.

What is claimed is:

1. A method for detecting corresponding regions between primary color picture images, comprising respective steps of:
    detecting mutual color concentration distribution in operation object regions;
    converting three primary color signals of color picture images to at least two signals based on said three primary color signals so as to correct influence on brightness of said color picture images;
    calculating the variance of the mutual color concentration distribution in the operation object regions of said three primary color picture images from at least two signals obtained by converting said three primary color signals according to said step of converting; and thereafter
    detecting a set of said operation object regions of said three primary color picture images in which the variance value which is calculated according to said step of calculating is minimum and which is the corresponding region.

2. A method for detecting corresponding regions among three primary color picture images which are correlated with a form distribution in an actual field, comprising respective steps of:
    detecting mutual color concentration distribution in operation object regions;
    memorizing three primary color picture images in respective picture image memorizing means;
    setting operation object regions for said respective picture images which have been memorized in said picture image memorizing means;
    converting three primary color signals in the operation object regions of the respective picture images to at least two signals based on said three primary color signals so as to correct influence on brightness of said color picture images;
    calculating the variance of the mutual color concentration distribution in the operation object regions of said three primary color picture images from at least two signals obtained by converting said three primary color signals according to said step of converting; and thereafter
    comparing the respective variance values in a plurality of sets of operation object regions of said three primary color picture images which are obtained by changing one of said operation object regions and detecting the set of regions in which the variance value which is calculated according to said step of calculating is minimum and which is the corresponding region.

3. A method according to claim 1 or 2 wherein said step of converting three primary color signals to at least two signals based on said three primary color signals includes converting the same by dividing the respective concentrations of the picture elements located in same positions of the operation object regions of the three primary color picture images respectively by the sume of the respective concentrations.

4. A method according to claim 3 wherein said step of calculating the variance of the mutual concentration distribution in the operation object regions of said three primary color picture images includes calculating the variance of the distance between coordinate of each mutual concentration value as converted and the coordinate of an average of the concentration values as converted.

5. A method according to claim 1 or 2 wherein said step of converting said three primary color signals to at least two signals based on said three primary color signals includes converting the same by dividing the respective concentrations of the picture elements located in same positions of the operation object regions of two picture images among the three primary color picture images by the sum of the concentrations of the picture elements located in the same positions of the operation object regions of the three primary color picture images.

6. A method according to claim 5 wherein said step of calculating the variance of the mutual concentration distribution in the operation object regions of said three primary color picture images includes calculating the variance of a distribution of the concentration differences of the picture elements located in the same positions of the operation object regions of said two picture images as converted.

7. A method according to claim 1 or 2 wherein said step of converting said three primary color signals to at least two signals based on said three primary color signals includes converting said three primary color signals to three signals including a signal representing the brightness and said step of calculating the variance of the mutual concentration distribution in the operation object regions of said three primary color picture images includes calculating the variance of the mutual concentration distribution in the operation object regions of said three primary color picture images.

8. A method according to claim 7 wherein said three signals including the signal representing the brightness are a brightness signal Y signal and two of a chromatic aberration signal I signal and Q signal.

9. A method according to claim 7 wherein said step of calculating the variance of the mutual concentration distribution in the operation object regions of said three primary color picture images includes calculating the variance of the distance between the coordinate of each of two signals corresponding to the respective picture images and the coordinate of the average of said two signals.

10. A method according to claim 1 or 2 wherein said step of converting said three primary color signals to at least two signals based on said three primary color signals includes detecting a principal component direction in which the variance of a mutual concentration distribution of said three primary color picture images is largest and two directions intersecting at right angles with it and converting said three primary color signals to be of three component values including a principal component value in which the variance is largest and said step of calculating the variance of the mutual concentration distribution in the operation object regions of said three primary color picture images includes calculating the variance of the mutual concentration distribution in the operation object regions of said three color picture images from two values obtained by excluding the principal component value in which the variance is largest from said three principal values.

11. A method according to claim 10 wherein said step of calculating the variance of the mutual concentration distribution in the operation object regions of said three primary color picture images includes calculating the variance of the distance between a coordinate of each of said two values corresponding to respective picture elements and a coordinate of the average of said two values in a plane in which said two values obtained by excluding the principal component value in which the variance is largest from said three principal component values are respectively made variable.

12. A method according to claim 1 or 2 wherein said step of converting said three primary color signals to at least two signals based on said three primary color signals includes converting the same by calculating the standard deviation of concentration values of respective picture elements in the operation object regions of said three primary color picture images and dividing the concentrations of the respective picture elements of the operation object regions of the respective picture images by said standard deviation in said picture images.

13. A method according to claim 12 wherein said step of calculating the variance of the mutual concentration deviation in the operation object regions of said three primary color picture images includes calculating the variance of the distance between a coordinate of each mutual concentration value as converted and the coordinate of the average of concentration values as converted in a space in which the concentrations of the picture elements located in same positions of the operation object regions of said three primary color picture images are respectively made variables.

14. A method according to claim 1 or 2 wherein said step of converting said three primary color signals to at least two signals based on said three primary color signals includes converting the same by calculating respectively the standard deviations of concentration values of respective picture elements in the operation object regions of said three primary color picture images and dividing respectively the concentrations of the respective picture elements of the operation object regions of respective picture images by said standard deviation in said picture image and further by the sum of concentrations divided by said standard deviation.

15. A method according to claim 14 wherein said step of calculating the variance of the mutual concentration distribution in the operation object regions of said three primary color picture images includes calculating the variance of the distance between a coordinate of each mutual concentration value as converted and a coordinate of the average of concentration values as converted in a space in which the concentrations of the picture elements located in same positions of the operation object regions of said three primary color picture images are respectively made variables.

16. A method for correcting color displacements of electronic endoscope picture images by a field sequential system, comprising respective steps of:

detecting mutual color concentration distribution in operation object regions;
  setting first and second operation object regions with each picture element as a center for the respective picture elements for two respective picture images of three primary color picture images;
  setting a third operation object region for detecting the regions corresponding to said first and second operation object regions for another picture image among said three primary color picture images;
  converting said three primary color signals in said operation object regions of the respective picture images to at least two signals based on said three primary color signals;
  calculating the variance of the mutual color concentration distribution in said first, second and third operation object regions from the converted signals;
  comparing the respective variance values in a plurality of sets of the operation object regions obtained by converting said third operation object region and detecting the set of regions in which the variance value is at a minimum;
  detecting the displacement between the regions in which the variance value is at a minimum; and thereafter
  correcting an address of the picture element in the center of said third operation object region when the variance value is at a minimum.

17. An apparatus for detecting corresponding regions between primary color picture images, comprising:

detecting means for detecting mutual color concentration distribution in operation object regions;
  a converting means for converting three primary color signals of color picture images to at least two signals based on said three primary color signals so as to correct influence on brightness of said color picture images;
  a variance calculating means operably connected to said converting means for calculating the variance of the mutual color concentration distribution in the operation object regions of said three primary color picture images from at least two signals obtained by converting said three primary color signals according to said converting means; and
  a corresponding region detecting means operably connected to said variance calculating means for detecting the set of operation object regions of said three primary color picture images in which the variance value calculated by said variance calculating means is minimum and which is the corresponding region.

18. An apparatus for detecting corresponding regions between picture images, comprising:

detecting means for detecting mutual color concentration distribution in operation object regions;
  a picture image memorizing means for memorizing respective three primary color picture images;
  a region setting means operably connected to said picture image memorizing means for setting respective operation object regions for the respective picture images memorized in said picture image memorizing means;
  a converting means operably connected to said region setting means for converting said three primary color signals in the operation objects regions of the respective picture images to at least two signals based on said three primary color signals so as to correct influence on brightness of said color picture images;

a variance calculating means operably connected to said converting means for calculating the variance of the mutual color concentration distribution in the operation object regions of said three primary color picture images from at least two signals obtained by converting said three primary color signals according to said converting means;

a comparing means operably connected to said variance calculating means for comparing the variance value calculated by said variance calculating means with a reference value;

a memorizing means capable of memorizing said reference value and an address of the operation object region;

a memory controlling means for controlling said memorizing means to memorize said variance value as a new reference value in case the output of said comparing means is input and said variance value is smaller than said reference value and the address of the operation object region then becomes a new address; and a controlling means for comparing said variance value with said reference value by said comparing means for obtaining a variance value which is calculated according to said variance calculating means in a different set of operation object regions of said three primary color picture images and then for controlling said region setting means to change one of said operation object regions.

19. An apparatus according to claim 17 or 18 wherein said converting means comprises a calculating means for converting the same by dividing the respective concentrations of the picture elements located in same positions of the operation object regions of said three primary color picture images by the sum of the respective concentrations.

20. An apparatus according to claim 19 wherein said variance calculating means comprises a calculating means for calculating the variance of the distance between a coordinate of each mutual concentration value as converted and a coordinate of the average of concentration values as converted in a space in which the concentrations of the picture elements located in the same positions of the operation object regions of said three primary color picture images are respectively made variables.

21. An apparatus according to claim 19 wherein said variance calculating means comprises:

a first calculating means for calculating the square of the deviation between a concentration as converted of each picture element and the average value of the concentrations as converted;

a second calculating means for adding the calculation results of said first calculating means of respective operation object regions; and a third calculating means for calculating the variance of the square root of the calculation result of said second calculating means.

22. An apparatus according to claim 21 wherein said third calculating means comprises a fourth calculating means for calculating the average value of the calculation results of said second calculating means, a fifth calculating means for calculating the square of the average of the square roots of said second calculation results and a sixth calculating means for substrating said fifth calculation result from said fourth calculation result and calculating the variance of the square roots of the calculation results of said second calculating means.

23. An apparatus according to claim 17 or 18 wherein said converting means comprises a calculating means for converting respective concentrations of the picture elements located in same positions of the operation object regions of the two picture images of said three primary color picture images by dividing the same by the sum of the concentrations of the picture elements located in same positions of the operation object regions of said three primary color picture images.

24. An apparatus according to claim 23 wherein said variance calculating means comprises a calculating means for calculating the variance of a distribution of the differences of concentrations of the picture elements located in the same positions of the operation object regions of said two picture images as converted.

25. An apparatus according to claim 17 or 18 wherein said converting means comprises a means for converting three primary color signals to three signals including a signal representing the brightness and said variance calculating means comprises a calculating means for calculating the variance of the mutual concentration distribution in the operation object regions of said three primary color picture images from the two signals obtained by excluding the signal representing the brightness from said three signals as converted.

26. An apparatus according to claim 25 wherein said converting means is a means for converting said three primary color signals to a brightness signal Y signal and two chromatic aberration signals I signal and Q signal.

27. An apparatus according to claim 25 wherein said variance calculating means comprises a calculating means for calculating the variance of the distance between a coordinate of each of the two signals corresponding to respective picture elements and a coordinate of the average of the two signals in a plane in which the two signals obtained by excluding the signal representing the brightness from the three signals as converted as respectively made variables.

28. An apparatus according to claim 17 or 18 wherein said converting means comprises a principal component analyzing means for detecting the principal component direction in which the variance of the mutual concentration distribution of the three primary color picture images is largest and two directions intersecting at right angles with said principal component direction and a converting means for converting the three primary color signals to be of the three principal component values including a principal component value in which the variance is largest and said variance calculating means comprises a calculating means for calculating the variance of the mutual concentration distribution in the operation object regions of said three primary color picture images from the two values obtained by excluding a primary component value in which the variance is largest from said three principal component values.

29. An apparatus according to claim 28 wherein said variance calculating means comprises a calculating means for calculating the variance of the distance between a coordinate of each of the two values corresponding to the respective picture elements and a coordinate of the average of the two values.

30. An apparatus according to claim 17 or 18 wherein said converting means comprises a calculating means for calculating respectively the standard deviations of concentration values for the respective picture images in the operation object regions of said three primary color picture images and a converting means for converting the concentrations of the operation object regions of the respective picture images by dividing the same by said standard deviation in said picture images.

31. An apparatus according to claim 30 wherein said variance calculating means comprises a calculating means for calculating the variance of the distance between a coordinate of each mutual concentration value as converted and the coordinate of the average of the concentration values as converted in a space in which concentrations of the picture elements located in same positions of the operation object regions of said three primary color picture images are respectively made variables.

32. An apparatus according to claim 17 or 18 wherein said converting means comprises a calculating means for calculating respectively the standard deviations of concentration values for respective picture elements in the operation object regions of said three primary color picture images, a calculating means for dividing the concentrations of the respective picture elements of the operation object regions of the respective picture images respectively by said standard deviation in said picture images and a converting means for converting concentrations of the respective picture elements divided by said standard deviation by dividing the same by the sum of the concentrations divided by said standard deviation.

33. An apparatus according to claim 32 wherein said variance calculating means for calculating the variance of the distance between a coordinate of each mutual concentration value as converted and a coordinate of the average of concentration values as converted in a space in which concentrations of the picture elements located in same positions of the operation object regions of said three primary color picture images are respectively made variables.

34. An apparatus for correcting color displacements of electronic endoscope picture images by a field sequential system, comprising:
  detecting means for detecting mutual color concentration distribution in operation object regions;
  a region setting means for setting first and second operation object regions with the picture images as centers for the respective picture images for two respective picture images of the three primary color picture images, and for setting a third operation object region for detecting regions corresponding to said first and second operation object regions for another picture image of said three primary color picture images;
  a converting means operably connected to said region setting means for converting the three primary color signals in said operation object regions of the respective picture images to at least two signals based on said three primary color signals;
  a variance calculating means operably connected to said converting means for calculating the variance of the mutual color concentration distribution in the first, second and third operation object regions set by said region setting means from the signals converted by said converting means;
  a corresponding region detecting means operably connected to a variance calculating means for comparing the respective variance values in a plurality of sets of the operation object regions obtained by changing the third operation object region by said region setting means and detecting the set of regions in which the variance value is at a minimum;
  a detecting means operably connected to said corresponding region detecting means for detecting the displacement between the regions in which the variance value is at a minimum and which are detected by said corresponding region detecting means;
  a memorizing means operably coupled to said detecting means for memorizing the displacement detected by said detecting means; and
  an address corresting means operably connected to said memorizing means for correcting an address of the picture element in the center of the third operation object region when the variance value is at a minimum on the basis of the displacement memorized in said memorizing means.

35. An electronic endoscope apparatus of a field sequential system, comprising:
  detecting means for detecting mutual color concentration distribution in operation object regions;
  an endoscope having an illuminating means for sequentially radiating lights of different colors onto an object to be imaged, and an imaging means for imaging said object image corresponding to the illuminating lights of the respective colors radiated by said illuminating means;
  a first memorizing means operably connected to said imaging means for memorizing three respective primary color picture images imaged by said imaging means;
  a region setting means operably connected to said first memorizing means for setting respective operation object regions for said three primary color picture images memorized in said first memorizing means;
  a converting means operably connected to said region setting means for converting the three primary color signals in the operation object regions of the respective picture images to at least two signals based on said three primary color signals;
  a variance calculating means operably connected to said converting means for calculating the variance of the mutual color concentration distribution in the operation object regions of said three primary color picture images from the signals converted by said converting means;
  a corresponding region detecting means operably connected to said variance calculating means for detecting the set of regions in which the variance value calculated by said variance calculating means is at a minimum;
  a detecting means operably connected to said corresponding region detecting means for detecting the displacement between the regions in which the variance value detected by said corresponding region detecting means is at a minimum;
  an address correcting means operably connected to said detecting means for correcting addresses of said three primary color picture images on the basis of the displacement detected by said detecting means;
  a second memorizing means operably connected to said address correcting means for memorizing the picture images having the corrected addresses; and
  a signal processing means operably connected to said first and second memorizing means for forming video signals having color displacements corrected by reading the picture image having the corrected address out of said second memorizing means, and for reading the picture image having the uncorrected address out of said first memorizing means.

* * * * *